(12) United States Patent
Maker et al.

(10) Patent No.: US 12,718,817 B2
(45) Date of Patent: Aug. 25, 2026

(54) USE OF CONTEXT TO DISAMBIGUATE AUTOMATION-CONFIGURATION COMMAND

(71) Applicant: Roku, Inc., San Jose, CA (US)

(72) Inventors: Frank Maker, Livermore, CA (US); Yu-Cheng Lin, Golden, CO (US); Nicholas Alexander Lineback, Denver, CO (US); Michael Cutter, Golden, CO (US)

(73) Assignee: Roku, Inc., San Jose, CA (US)

( * ) Notice: Subject to any disclaimer, the term of this patent is extended or adjusted under 35 U.S.C. 154(b) by 160 days.

(21) Appl. No.: 18/825,772

(22) Filed: Sep. 5, 2024

(65) Prior Publication Data

US 2026/0065906 A1 Mar. 5, 2026

(51) Int. Cl.

| | |
|---|---|
| ***G10L 15/22*** | (2006.01) |
| ***G10L 15/30*** | (2013.01) |
| *G16Y 10/75* | (2020.01) |

(52) U.S. Cl.

CPC .............. *G10L 15/22* (2013.01); *G10L 15/30* (2013.01); *G10L 2015/223* (2013.01); *G10L 2015/228* (2013.01); *G16Y 10/75* (2020.01)

(58) Field of Classification Search

None

See application file for complete search history.

(56) References Cited

U.S. PATENT DOCUMENTS

| | | | | |
|---|---|---|---|---|
| 10,593,326 | B2 * | 3/2020 | Teasley | G10L 15/22 |
| 2015/0162006 | A1 * | 6/2015 | Kummer | H04N 21/6143 704/275 |
| 2016/0314788 | A1 * | 10/2016 | Jitkoff | H04M 1/72457 |

* cited by examiner

*Primary Examiner* — Antim G Shah

(74) *Attorney, Agent, or Firm* — McDonnell Boehnen Hulbert & Berghoff LLP

(57) ABSTRACT

A method and system for use of context information to disambiguate an automation-configuration command. In an example method, a computing system receives a voice command uttered by a user into a voice-interface device, the voice command describing an Internet-of-Things (IoT) automation. Further, in response to receiving the voice command, the computing system determines, based on context information not specified by the voice command, which of multiple IoT devices should be a subject of an IoT rule that implements the described IoT automation, and provisions the IoT rule with the determined IoT device as the subject of the IoT rule. In example implementations, the context information could be based on network signaling between devices, ambient audio in the user's environment, and/or one or more other factors.

16 Claims, 8 Drawing Sheets

Fig. 8

USE OF CONTEXT TO DISAMBIGUATE AUTOMATION-CONFIGURATION COMMAND

SUMMARY

A typical Internet of Things (IoT) ecosystem includes a number of IoT devices (i.e., physical “things”), which may be nonstandard computing devices that are configured with embedded logic to carry out useful functions and that are arranged to connect wirelessly or otherwise with a network and to engage in data communications with each other and with local or cloud-based IoT control applications, among other possibilities.

There are countless examples of IoT devices. In the consumer space, for instance, examples include smart light switches, video doorbells, power outlets, thermostats, window treatment, lightbulbs, locks, cameras, and security systems, among others. And in the commercial space, examples include smart vehicles, healthcare monitors and other equipment, power grids, environmental monitors, and agricultural equipment, among others.

In an example arrangement, a user (e.g., a person, a company, etc.) may own and/or operate an IoT ecosystem that includes a set of one or more IoT devices associated with the user. The devices in the user's IoT ecosystem may be compliant with an IoT framework that defines protocols for device operation and interaction. Further, the IoT ecosystem may include an IoT control subsystem that may help to govern devices in the ecosystem, such as monitoring and controlling operational state of and interaction between the devices.

The IoT control subsystem could be centralized and/or distributed. For instance, aspects of the control subsystem could be provided in a centralized hub or other controller device locally at the user's premises (e.g. home or office) and could be set to communicate with the various IoT devices through a local area network (LAN) or other arrangement. Alternatively or additionally, aspects of the control subsystem could be provided in a cloud-based system, possibly one operated by an IoT service provider to which the user subscribes, and could be set to communicate with the various IoT devices through a wide area network (WAN) and a LAN or other arrangement. Still alternatively or additionally, aspects of the control subsystem could be distributed among the IoT devices themselves. For instance, each of various devices in the IoT ecosystem could maintain a copy of control-subsystem data and operational logic, to facilitate device control.

The IoT control subsystem could include or have access to a device-registry that identifies the devices within the user's IoT ecosystem and specifies for each device a set of associated metadata, such as device type and operational state (e.g., current on/off status, level, location, etc.) As the user acquires new IoT devices, the user may register the devices with the control subsystem, which may result in adding the devices to the device-registry. Further, as the operational state of devices in the ecosystem changes, associated signaling could be provided to the control subsystem to update the device registry accordingly.

In a representative arrangement, the IoT control subsystem could allow the user to set up automation rules associated with various devices in the user's IoT ecosystem and could then be set to apply those automation rules. These automation rules could define triggers and associated actions in relation to devices in the ecosystem and could take various forms. Without limitation, for instance, example automation rules may include (i) making a specified change in operational state of a specified device in response to a current time of day being a specified time of day, (ii) making a specified change in operational state of a specified device in response to detecting a specified operational state of one or more other specified devices, and (iii) generating and sending a specified alert or other message in response to detecting a specified operational state of one or more specified devices.

In some implementations, the IoT control subsystem may allow the user to configure these or other automation rules through a graphical user interface (GUI) provided by a device in or associated with the ecosystem (e.g., in an associated IoT app running on the user's smartphone), which may include and/or interface with the control subsystem. Such a GUI may provide the user with a menu of the devices in the ecosystem and menus of associated triggers and actions, and may enable the user to make simple menu selections in order to build automation rules that define specific triggers and actions in relation to specific devices in the ecosystem. The control subsystem may then store and apply those established automation rules.

Requiring a user to manually build IoT automation rules through a GUI or other such interface, however, may be technically challenging. Even presented with simple menu options, some users may find it difficult to design automation rules through such an interface.

A technical solution to this issue may be to provide a natural language interface through which a user can express in natural language a desired automation rule in order to provision the IoT ecosystem with the automation rule. For instance, it would be useful to provide a voice user interface through which a user could simply speak in natural language an automation-configuration command in order to provision the system with a desired automation rule. Alternatively, it would be useful to provide a chatbot interface through which a user could simply type in natural language an automation-configuration command in order to provision the system with a desired automation rule. Still alternatively, it would be useful to provide a sign-language-recognition interface (e.g., camera-based interface or motion-based interface) through which a user could convey through sign-language an automation-configuration command in order to provision the system with a desired automation rule.

Unfortunately, however, use of a natural language interface for provisioning IoT automation rules may create another technical issue. In particular, there is a risk with natural-language input that a user's automation-configuration command may be ambiguous.

Without limitation, examples of ambiguity in an automation-configuration command may arise from indefinite terms such as a mention of “the” device without indicating which device, and a mention of “here” without indicating where. For instance, ambiguous automation-configuration commands may include (i) “when the motion sensor detects motion, turn on the light and the camera”—which may be ambiguous if there is more than one motion sensor, more than one light, and/or more than one camera in the user's IoT ecosystem, (ii) “at 8:00 am each day, open the window shade”—which may be ambiguous if there is more than one window shade in the user's IoT ecosystem, and (iii) “when the temperature in this room is above 73° F., turn on the fan”—which may be ambiguous if there is more than one room associated with the user's IoT ecosystem and/or more than one fan in user's IoT ecosystem.

Disclosed is a technical solution to help address this issue. In accordance with the disclosure, when a computing system receives a natural-language automation-configuration command from a user, the computing system will detect an ambiguity in the received command, and the computing system will then use context information as a basis to resolve the ambiguity, i.e., to disambiguate the received command. The computing system will then configure itself with an IoT automation rule based on the disambiguated received command, and the computing system may apply the configured IoT automation rule.

The computing system may use various techniques for disambiguating the user's automation-configuration command.

By way of example, if it is unclear which of multiple candidate devices in the ecosystem the user's automation-configuration command refers to (e.g., if the command refers to a device using a demonstrative pronoun such as "this", "that", "those", or "these"), the computing system may resolve the ambiguity based on consideration of wireless signal strength or signal timing between (i) an interface-device into which the user issued the automation-configuration command and (ii) a given one of the candidate devices. Alternatively, the computing system may resolve the ambiguity based on analysis of a video feed that shows the user pointing to one candidate device or another at the time the user issued the automation-configuration command.

As another example, if it is unclear which of multiple candidate devices in the ecosystem the user's automation-configuration command refers to, and if at least one of the candidate devices is indoors and at least another of the candidate devices is outdoors, the computing system may resolve the ambiguity based at least on consideration of ambient audio in the user's environment when the user issued the automation-configuration command. For instance, the computing system may determine whether the audio includes outdoor sound (e.g., birds chirping, wind blowing, etc.) and if so may conclude that the user was referring to an outdoor device.

The computing system may also take into account a pre-established knowledge graph or similar data related to the user's IoT ecosystem. A knowledge graph may interrelate various entities (e.g., devices, rooms, users, and so forth) in or associated with the user's IoT ecosystem, based on manual input and/or observation over time, and the computing system may use those interrelationships as a basis to resolve ambiguity in a user's automation-configuration command.

For instance, a knowledge graph may indicate which of multiple cars in the user's household the user drives. This information may be manually set or a computing system may infer this information based on observation of user actions over time. For instance, to infer that a given user drives a given car, the computing system may correlate one or more instances of (i) the given user's mobile phone leaving the home at a particular time with (ii) a security camera feed showing, at that same time, the given car leaving the home. The computing system may then responsively record in the knowledge graph a connection between the given user and the given car.

When the given user then issues the automation-configuration command "Turn on the coach lights when my car approaches" and it is unclear which car the command refers to, the computing system may resolve that ambiguity by referring to such a knowledge graph to determine which car is the user's car.

Further, in some implementations, the computing system may respond to an ambiguous automation-configuration command from a user by requesting and receiving clarification from the user.

By way of example, if the computing system receives a user's automation-configuration command defining a trigger for turning on "the light" and does not indicate which of multiple lights in the IoT ecosystem "the light" is, the computing system could prompt the user to indicate which light the user meant. For instance, the computing system may successively turn on each of various candidate lights in the ecosystem and could receive an input from the user when the desired light is turned on, as an indication of which light the user meant.

As another example, if the computing system receives a user's automation-configuration command defining a trigger for turning on "the camera" and does not indicate which of multiple cameras in the IoT ecosystem "the camera" is, the computing system could prompt the user to indicate which camera the user meant. For instance, the computing system may present in an IoT app on the user's smartphone separate views from each of various candidate cameras in the ecosystem and could receive input from the user selecting one of the presented views as an indication of which camera the user meant.

These as well as other aspects, advantages and alternatives will become apparent from reading the following detailed description with reference where appropriate to the accompanying drawings. Further, it should be understood that the implementations described in this summary and in the following description and drawings are intended as examples only and that numerous variations could be possible.

BRIEF DESCRIPTION OF THE DRAWINGS

FIG. 8 is another flow chart illustrating an a method to help disambiguate an automaton-configuration command.

DETAILED DESCRIPTION

The present description will discuss example implementation in the context of an IoT ecosystem at a user's home and/or other site, and where the user issues an automation-configuration command in natural language through a voice user interface (VUI). It will be understood, however, that the disclosed principles could apply as well in other scenarios, such as where the user issues the automation-configuration command in natural language through another interface, examples of which could include a chatbot interface or a sign-language-recognition interface for instance.

Further, it will be understood that the disclosed arrangements and processes described herein could take various other forms. For instance, elements and operations could be re-ordered, distributed, replicated, combined, omitted, added, or otherwise modified. In addition, elements described as functional entities could be implemented as discrete or distributed components or in conjunction with other components/modules, and in any suitable combination and location. In addition, various operations described as being carried out by one or more entities could be implemented by and/or on behalf of those entities, through hardware, firmware, and/or software, such as by one or more processing units executing program instructions stored in memory, among other possibilities.

Figure 1:
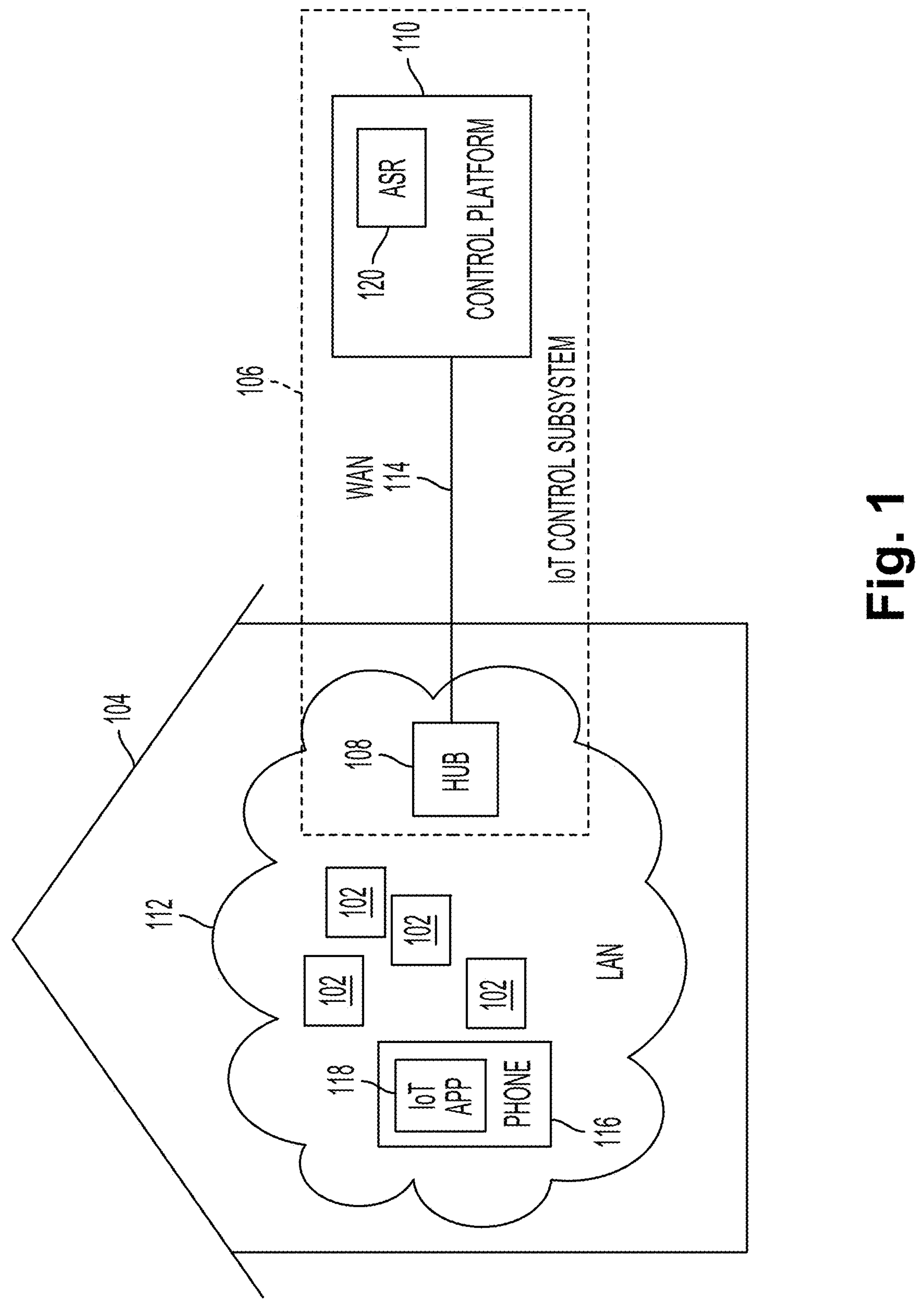
FIG. 1 is a simplified block diagram of an example system in which disclosed features can be implemented.

Referring to the drawings, as noted above, FIG. 1 is a simplified block diagram illustrating an example system in which various disclosed features could be implemented. As shown in FIG. 1, the example system comprises a user's IoT ecosystem including various IoT devices 102 at the user's home 104, and including an IoT control subsystem 106.

For illustrative purposes, the IoT control subsystem 106 is shown comprising a client-side control device 108 (e.g., IoT hub) and a server-side control platform 110, interconnected with each other by a LAN (and/or wireless mesh network) 112 and a WAN 114 such as the internet. Further, in the example implementation, the user has a smartphone 116, and the IoT control subsystem 106 may include or be in communication with an associated IoT app 118 running on the user's smartphone 116 or other computing device. Still further, the server-side platform 110 is shown including an automatic-speech-recognition (ASR) engine 120. As noted above, aspects of the IoT control platform could be provided in other ways as well, such as being distributed among the IoT devices themselves for instance.

The IoT devices 102 in the user's IoT ecosystem could be any IoT devices, such as but not limited to any of the examples noted above, which may be configured to operate according to a common IoT framework and to communicate wirelessly with each other and with the IoT control subsystem 106, e.g., using Wi-Fi, Bluetooth, or another agreed wireless communication protocol, through wireless mesh networking and/or through an access point for instance.

Each IoT device may have associated properties. For instance, each IoT device may have a device type (e.g., light, fan, window shade, power outlet, motion sensor, etc.) Further, each device may have a unique identifier, such as a Media Access Control (MAC) address for instance, which may correlate with the device's manufacturer and type. Still further, each device may have an operational state, such as its current settings, readings, location, and/or the like. Each device may also have a device name by which the user may refer to the device, possibly a name that correlates the device's type with an assigned location of the device (e.g., a given room of the user's home) (e.g., “foyer light”, “kitchen light”, “mudroom motion sensor”, etc.)

Figure 2:
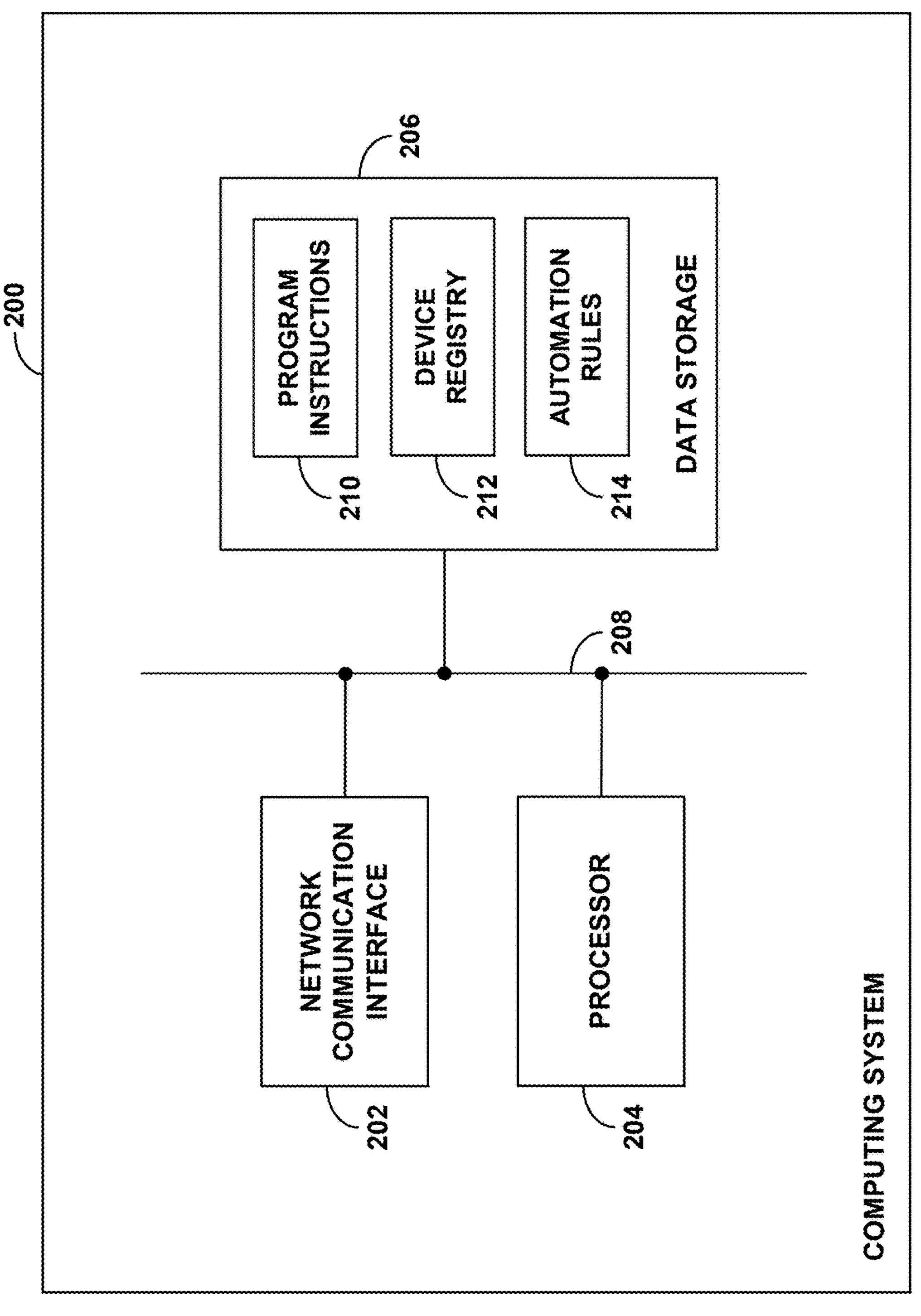
FIG. 2 is a simplified block diagram of an example computing system.

FIG. 2 illustrates components of an example computing system 200 that may function as at least part of the IoT control subsystem 106. This computing system 200 may be provided at the user's home 104 as or at the client-side control device 108, and/or in the server-side platform 110, among other possibilities. As shown in FIG. 2, the example computing system 200 includes at least one network communication interface 202, at least one processor 204, and non-transitory data storage 206, which could be integrated together and/or communicatively linked with each other by a system bus or other connection mechanism 208.

The at least one network communication interface 202 could comprise one or more components that would enable the computing system to engage in ad hoc or other network communication with one or more other components of the system. For instance, the network communication interface 202 could comprise a wired network interface module such as an Ethernet module and/or a wireless communication interface such as a Wi-Fi, Bluetooth, cellular, or other interface, among other possibilities.

The at least one processor 204 could comprise one or more general purpose processors (e.g., microprocessors) and/or one or more special-purpose processors (e.g., digital signal processors (DSPs), graphics processing units (GPUs), neural processing units (NPUs), etc.) Further, the non-transitory data storage 206 could comprise one or more volatile and/or non-volatile storage components such as optical, magnetic, or flash storage, RAM, ROM, EPROM, EEPROM, cache memory, and/or other computer-readable media, etc.

As shown, the data storage 206 may store program instructions 210, which could be executable by the processor 204 to carry out various operations described herein. Further, the data storage 206 could store a device registry 212 and automation rules 214.

In line with the discussion above, the device registry 212 could comprise data regarding each device 102 in the IoT ecosystem, such as specifications of the above-noted properties per device. Further, the device registry 212 may store information about associated devices, such as information identifying the user's smartphone 116, and information identifying one or more other user-interface devices accessible by the user.

The automation rules 214 could then comprise data that defines each of various automation rules established for the user's IoT ecosystem. This data could define each automation rule as a logical construct with at least a specific trigger and a specific action, where occurrence of the trigger would cause performance of the action. Using the examples above, for instance, example automation rules might be stored in the form of (i) Trigger: foyer motion sensor detects motion; Action: foyer lights turn on, foyer camera turns on, (ii) Trigger: time of day is 8:00 am; Action: open master bedroom window shades, and (iii) Trigger: family room thermostat reading exceeds 73° F.; Action: turn on family room fan.

Further in line with the discussion above, the computing system 200 may operate to monitor and/or control operational state of the various devices 102 in the IoT ecosystem, through communication with the devices 102. Under the example IoT framework, for instance, various devices 102 may report their operational state to the computing system 200, and the computing system 200 may update the device registry 212 when appropriate. Further, the computing system 200 may send operational directives to various devices 102 to effect changes in operational state of the devices 102.

By way of example, some of the devices 102 may be sensors or other input devices, such as motion sensors, temperature sensors, doorbells, toggle switches, cameras, microphones, etc., which may have operational state defining what they have detected and/or what input they have received and may be configured to report that state to the computing system 200. For instance, a motion sensor may be configured to report to the computing system 200 the presence of motion when the motion sensor detects motion, a thermostat may be configured to report to the computing system 200 its current measured temperature upon detecting a change in temperature, a doorbell may be configured to report to the computing system 200 when the doorbell gets actuated, a toggle switch may be configured to report its toggle state to the computing system 200 when its toggle state changes, and a camera may be configured to capture video and publish the video as a real-time video stream for receipt by the computing system 200 and/or one or more other associated devices such as the user's smartphone 116, among other possibilities.

Further some of the devices 102 may be action or output devices, such as lights, fans, window shades, which may have operational state defining their current settings (e.g., on/off state, level, set point, etc.) and may be configured to report their operational state to the computing system 200 and to change their operational state in response to directives from the computing system 200. For instance, a light may have on, off, brightness, color, and color temperature settings and may be configured to report its current such settings to the computing system 200 and to receive and respond to directives from the computing system 200 to change those settings, and a window shade may have an open or closed setting and may be configured to report its current open/closed setting to the computing system 200 and to receive and respond to directives from the computing system to open or close.

Given its stored automation rules 214 and its communication with the devices 102 in the user's IoT ecosystem, the computing system 200 may thereby apply the automation rules 214 in practice. For example, given an automation rule to turn on the foyer lights and the foyer camera when the foyer motion sensor detects motion, the computing system 200 could respond to the foyer motion reporting detected motion by directing and thus causing the foyer lights to turn on and directing the foyer camera to start recording video. As another example, given an automation rule to open the master bedroom window shades at 8:00 am in the morning, the computing system 200 could respond to the current time of day being 8:00 am by directing and thus causing the window shades in the master bedroom to open.

As noted above, the IoT control subsystem 106 could support setting up of these or other such automation rules based on natural language input by the user. To facilitate this in an example implementation, each of one or more of the IoT devices 102 and/or one or more other associated devices may function as a voice-interface device that could receive a user's spoken automation-configuration command and could pass a digitized representation of that spoken utterance to the computing system 200 for processing. Without limitation, examples of such voice-interface devices may include (i) a voice-capable smart doorbell, (ii) a voice-capable smart thermostat, (iii) the user's smart phone, and (iv) a voice-capable remote control configured to control an electronic device such as a television or streaming media player. Some voice-interface devices may be statically positioned, and others may be portable (e.g., handheld).

A voice-interface device may include a microphone through which to receive audio and may be configured to detect user utterance of a wake-word phrase (e.g., "Hey Device!"), or other user input, and to responsively then receive, digitize, and pass along to the computing system 200 audio that may include natural language speech from the user defining an IoT-related command such as an automation-configuring command.

The computing system 200 may thus also be configured to receive this digitized audio from the voice-interface device and to process the digitized audio in order to facilitate setting up an automation rule in accordance with the user's automation-configuration command.

To do this in an example implementation, the computing system 200 may provide the digitized audio to the ASR engine 120, and the ASR 120 engine may translate the audio into a logical representation of the user's automation-configuration command. For instance, the ASR engine 120 may engage in conventional speech-to-text processing to translate the digitized audio representation of the user's automation-configuration command into a text version of the automation-configuration command. Further, the ASR engine 120 may apply conventional parsing logic to parse the resulting text representation into component parts that logically represent, for instance, a trigger and a responsive action. Given these component parts, the computing system 200 may then establish and store the logical construct defining the user-requested automation rule, in a manner that would allow the computing system to then apply the rule in practice.

As noted above, a technical issue with this process may be that the user's natural language automation-configuration command may be ambiguous, e.g., including one or more indefinite terms related to the IoT ecosystem.

For example, when the user is standing in the foyer of the user's home, the user may speak into a voice-interface device the automation-configuration command "Turn on these lights when the doorbell rings"—but the user may not indicate which IoT lights in the ecosystem are "the lights". As another example, when the user is standing outside of the user's home, the user may speak into a voice-interface device the automation-configuration command "Turn on this camera when there is any movement here"-without indicating where "here" is and without indicating which camera is "this camera".

As indicated above, the present disclosure provides a technical process to help overcome this issue, by considering context information and/or taking other action as a basis to help resolve the ambiguity. The following subsections walk through various example implementations to help illustrate how this could work in practice. These as well as other operations could also be applied in combination.

Use of Network Signaling Between a Command-Interface Device and Candidate IoT Devices as a Basis to Determine which IoT Device is a Subject of an Automation-Configuration Command As an example implementation, the computing system 200 could take into account network signaling between a command-interface device and candidate IoT devices as a basis to determine which IoT device a user meant by an indefinite reference to a device in the user's natural language automation-configuration command.

This implementation could apply in a scenario where the user's natural-language automation-configuration command directly or indirectly refers to a device in the user's IoT ecosystem but where that reference is indefinite because there are multiple devices in the IoT ecosystem that could be the referenced device. This could occur where the user refers to the device in relation to an automation trigger and/or where the user refers to the device in relation to an automation action.

Figure 3:
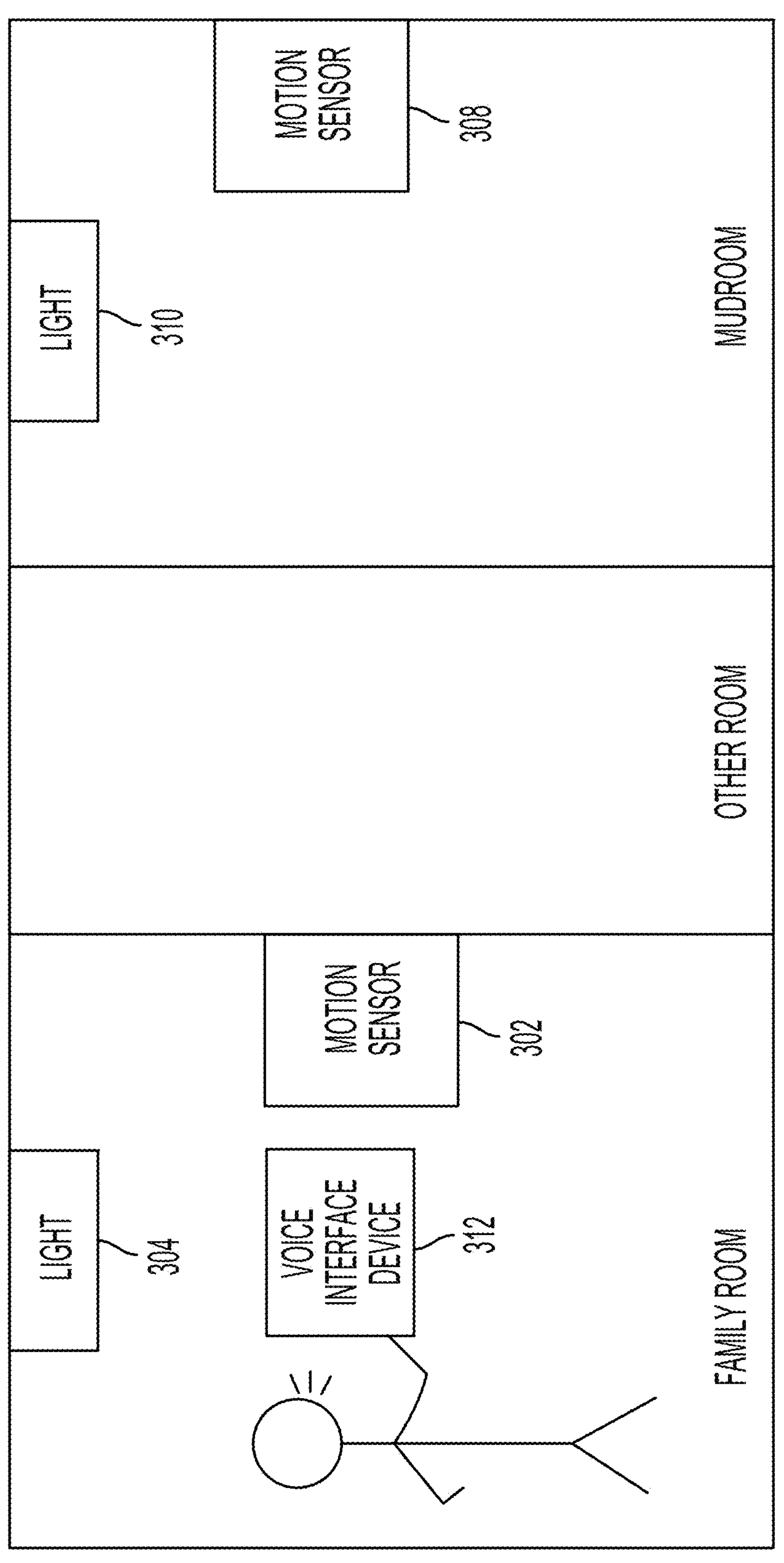
FIG. 3 is a simplified illustration of a scenario related to an ambiguous automation-configuration command.

FIG. 3 illustrates an example of this scenario. As shown in FIG. 3, the family room 300 of the user's home includes a family-room motion sensor 302 and a family-room light 304, and the mudroom of the user's home includes a mudroom motion sensor 308 and a mudroom light 310. In this scenario, as shown, the user may be standing in the family room 300 and may speak into a voice-interface device 312 the natural language automation-configuration command "Turn on this light when there is movement here"-without specifying which light is "this light" and without specifying where "here" is for detecting movement.

In line with the discussion above, the voice-interface device 312 may send to the computing system 200 a digitized audio representation of this uttered automation-configuration command. ASR processing of this command may then result in a determination that (i) the trigger per the automation-configuration command is "a motion sensor" detecting motion and (ii) the action to take in response to that trigger per the automation-configuration command is to turn on "this light". Further, the computing system 200 may determine from the device registry 212 that there are at least two candidate motion sensors 302, 308 and at least two candidate lights 304, 310 in the user's IoT ecosystem. At issue for the computing system 200 is then which motion sensor and which light are to be subjects of the requested automation rule.

To help resolve this ambiguity, first of all, the computing system 200 could determine based on analysis of the spoken voice command that the "motion sensor" and "light" should both be devices near the user when the user uttered the automation-configuration command, since the user referred to "movement here" and "this" light. For instance, the computing system could determine this by detecting the user's utterance of the associated words "here" and "this". Given this determination, the computing system 200 could then proceed to use network signaling (e.g., wireless and/or wired network signaling) as a basis to determine which motion sensor and light the user intended.

In this example, the computing system 200 could take into account network signaling respectively between the voice-interface device 312 and each candidate device, in order to select the intended IoT devices based on the network signaling with the intended IoT devices having least signal latency, being strongest, and/or otherwise indicating the greatest proximity to the voice-interface device 312 and thus to the user.

As shown in FIG. 3, for instance, to determine which motion sensor the user intended when referring to "movement here," the computing system 200 could first identify from the device registry 212 each candidate motion sensor in the user's IoT ecosystem, which would include at least the family-room motion sensor 302 and mudroom motion sensor 308. The computing system 200 could then determine which of those identified motion sensors is closest to the voice-interface device 312 into which the user issued the automation-configuration command, by comparing network signaling between the devices.

For example, the computing system 200 may compare (i) wireless signal latency (i.e., signal travel time) between the voice-interface device 312 and the family room motion sensor 302 with (ii) wireless signal latency between the voice-interface device 312 and the mudroom motion sensors 308. Based on this comparison, and given the likely relationship between signal latency and distance, the computing system 200 may determine that the family room motion sensor 302 is closer than the mudroom motion sensor 308 to the voice-interface device that received the user's automation-configuration command. Therefore, the computing system 200 could conclude that the family room motion sensor 302 is the motion sensor that should be the subject of the automation rule to be configured in response to the user's spoken automaton-configuration command.

To facilitate this comparison, the computing system 200 could obtain the associated network signaling metrics from the IoT devices and/or from the voice-interface device 312. In an example implementation, for instance, the computing system 200 could signal to the devices to direct and thus cause them to engage in test signaling with each other and to report signaling metrics to the computing system 200.

For instance, the computing system 200 may signal to each of the motion sensors 302, 308, to cause each motion sensor to wirelessly broadcast a transmit-timestamped wireless signal (e.g., a Wi-Fi or Bluetooth beacon signal) that may carry the device's unique identification, and the computing system 200 may inform the voice-interface device 312 of each motions sensor's unique identification to facilitate scanning for the wireless broadcast signals and could direct and thus cause the voice-interface device 312 to scan for each motion sensor's respective wireless broadcast signal and to make associated measurements to facilitate a comparison. Based on this directive, the voice-interface device 312 may then measure wireless signal latency respectively for each motion sensor's broadcast signal, such as by determining receive time and comparing the determined receive time with the indicated transmit time, and may report accordingly to the computing system 200. Alternatively, the computing system 200 may instead direct the voice-interface device 312 to wirelessly broadcast a signal and the motion sensors 302, 308 to each measure and report respective wireless signal latency from the voice-interface device 312.

Alternatively, the computing system 200 may direct and thus cause the devices to measure and report their respective receive signal strength from each other. For instance, the computing system 200 may similarly cause each motion sensor 302, 308 to wirelessly broadcast a signal and may cause the voice-interface device 312 to measure and report receive signal strength of those signals, or the computing system may similarly cause the voice-interface device 312 to wirelessly broadcast a signal and may cause each motion sensor 302, 308 to measure and report receive signal strength of that signal.

The computing system 200 may then compare these metrics and determine that the family-room motion sensor 302 is closest to the voice-interface device 312 and is therefore the intended motion sensor. For instance, based on the signal latency between the family-room motion sensor 302 and the voice-interface device 312 being less than the signal propagation delay between the mudroom motion sensor 308 and the voice-interface device 312, the computing system 200 may conclude that the family-room motion sensor 302 is closest to the voice-interface device 312 and is therefore the intended motion sensor. Alternatively or additionally, based on the receive signal strength for signaling between the family-room motion sensor 302 and voice-interface device 312 being greater than the receive signal strength between the mudroom motion sensor 302 and the voice-interface device 312, the computing system 200 may conclude that the family-room motion sensor 302 is closest to the voice-interface device 312 and is therefore the intended motion sensor. Still alternatively or additionally, based on the number of mesh network nodes between the voice-interface device 312 and the family-room motion sensor 302 being less than the number of mesh network nodes between the voice-interface device 312 and the mudroom motion sensor 308, the computing system 200 may conclude that the family-room motion sensor 302 is closest to the voice-interface device 312 and is therefore the intended motion sensor.

Other mechanisms could be used as well to determine which candidate device is closest to the voice-interface device. For instance, the devices could engage in ranging with each other using a technique such as Bluetooth channel sounding or ultra-wideband ranging, to determine the voice-interface device's distance respectively between each motion sensor, and the computing system 200 could then determine that the motion sensor closer to the voice-interface device is the intended motion sensor.

Further, the computing system 200 may obtain these metrics in other ways, to facilitate the comparison. For instance, if the voice-interface device 312 has these metrics (e.g., based on regular monitoring) before it sends the spoken automation-configuration command to the computing system 200, the voice-interface 312 may include the metrics with its report to the computing system 200.

As noted above, the voice-interface device 312 could also take various forms. As shown in FIG. 3, for instance, the voice-interface device 312 could be a handheld device such as a remote control or smartphone, which the user may hold and utter the automation-configuration command into. Alternatively, the voice-interface device 312 may be another IoT device in the user's IoT ecosystem, such as a nearby voice-capable smart thermostat for instance. Other arrangements may be possible as well.

The computing system 200 may engage in similar processing as well to determine which light the user intended when mentioning "this light" as part of the user's automation-configuration command. For instance, the computing system may likewise determine that there are at least two candidate lights 314, 310 and may receive and compare signal propagation delay, signal strength, and/or other distance metrics as between the voice-interface device 312 and each candidate light. Based on this analysis, the computing system may thereby determine that the family-room light 304 is closest to the voice-interface device and is therefore the intended light.

Given this disambiguation, the computing system 200 may thereby establish that the user's automation-configuration command requests setup of an automation rule for turning on the family-room light 304 when the family-room motion sensor 302 detects motion. The computing system 200 may therefore configure itself with a logical construct defining that automation rule, and the computing system 200 may then apply that rule in practice.

Figure 4:
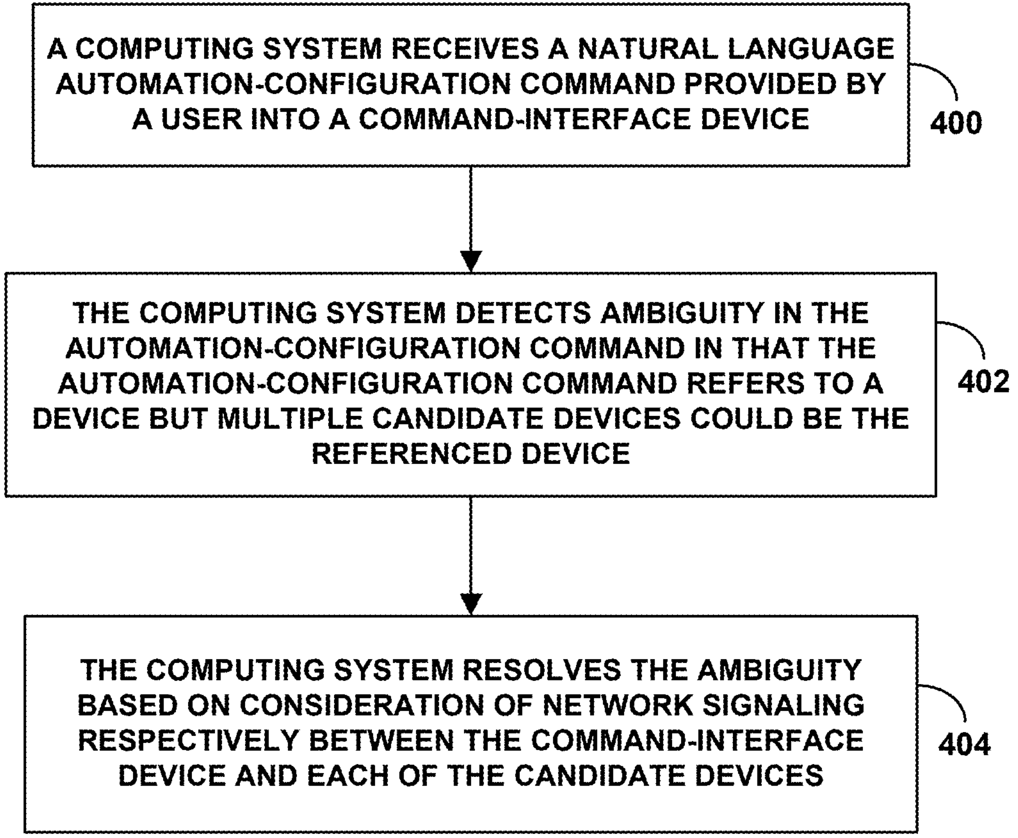
FIG. 4 is a flow chart illustrating a method to help disambiguate an automation-configuration command.

FIG. 4 is a flow chart illustrating this process. As shown in FIG. 4, at block 400, a computing system receives a natural language automation-configuration command provided by a user into a command-interface device (e.g., a voice-interface device, a chatbot-interface device, or as sign-language through a sign-language-interface device such as a camera). At block 402, the computing system then detects ambiguity in the automation-configuration command in that the automation-configuration command refers to a device but multiple candidate devices could be the referenced device. At block 404, the computing system then resolves the ambiguity based on consideration of network signaling respectively between the command-interface device and each of the candidate devices (e.g., based on signal latency and/or signal strength, among other possibilities).

Use of Ambient Audio as a Basis to Determine which IoT Device is a Subject of an Automation-Configuration Command As another example implementation, the computing system 200 could take into account ambient audio as a basis to determine which of multiple candidate IoT devices a user meant by an indefinite reference to a device in the user's natural language automation-configuration command.

This example can apply where the user issues the automation-configuration command verbally or otherwise where the user's automation-configuration command is accompanied by ambient audio.

As with the example above, this implementation could apply in a scenario where the user's natural-language automation-configuration command directly or indirectly refers to a device in the user's IoT ecosystem but where that reference is indefinite because there are multiple devices in the IoT ecosystem that could be the referenced device. And similarly, this could occur where the user refers to the device in relation to an automation trigger and/or where the user refers to the device in relation to an automation action.

The theory in this implementation is that background audio in the user's environment when the user issues the automation-configuration command may correspond with a location where the user is located at that time and may therefore help establish that the referenced IoT device is a device near that location. This could apply in any scenario where different locations have different signature ambient audio profiles, such as where one room in the user's home has a loud ticking clock sound while another room in the use's home has a loud air-conditioner sound, or where the outdoor area of the user's home has natural sounds like that of rain, crickets, or birds while the indoor areas of the user's home do not have such natural sounds and may have other signature sounds.

For this implementation, the per-device metadata in the device registry 212 may include information about background audio respectively at the location of each of various IoT devices in the user's IoT ecosystem, so that the computing system 200 could refer to the device registry as a basis to evaluate background audio received with the user's automation-configuration command.

This information about background audio respectively per IoT device location could comprise signature background audio, i.e., background audio that is representative of the location. This signature background audio per IoT device location could be established in various ways. For instance, the user could collect the signature background audio per device using an IoT app on the user's smartphone, to have the smartphone record ambient audio respectively at the location each of various IoT devices, e.g., through a "record background audio" option in the IoT app. Further, the computing system 200 could receive and store in the device registry 212 this recorded signature background audio per IoT device.

When the computing system 200 then receives the user's automation-configuration command with accompanying background audio and determines that the automation-configuration command includes an indefinite reference to an IoT device like that above, the computing system may then compare the accompanying background audio with the signature background audio of each of various candidate devices (e.g., applying audio pattern matching or other automatic audio recognition technology). Based on this comparison, the computing system 200 may thereby determine that the accompanying background audio matches or is otherwise most similar to the signature background audio of a given candidate device, as a basis to conclude that the given candidate device is what the user meant.

Alternatively or additionally, the information about background audio respectively per IoT device could comprise a type of the location of the device, which could correlate with signature background audio for that type of location. For instance, the device registry may specify that the location of a given IoT device in the ecosystem is "outdoor", which the computing system 200 may correlate generally with nature audio like that noted above, and that the location of another IoT device in the ecosystem is "indoor", which the computing system 200 may not correlate with such nature audio and/or may correlate with indoor-specific audio.

When the computing system 200 then receives the user's automation-configuration command and determines that the automation-configuration command includes an indefinite reference to an IoT device like that above, the computing system may determine from the device registry the type of location of each candidate device and may then compare the accompanying background audio with the signature background audio for each candidate device's type of location. Based on this comparison, the computing system 200 may thereby determine that the accompanying background audio matches or is otherwise most similar to the signature background audio for a given candidate device's type of location, as a basis to conclude that the given candidate device is what the user meant.

Figure 5:
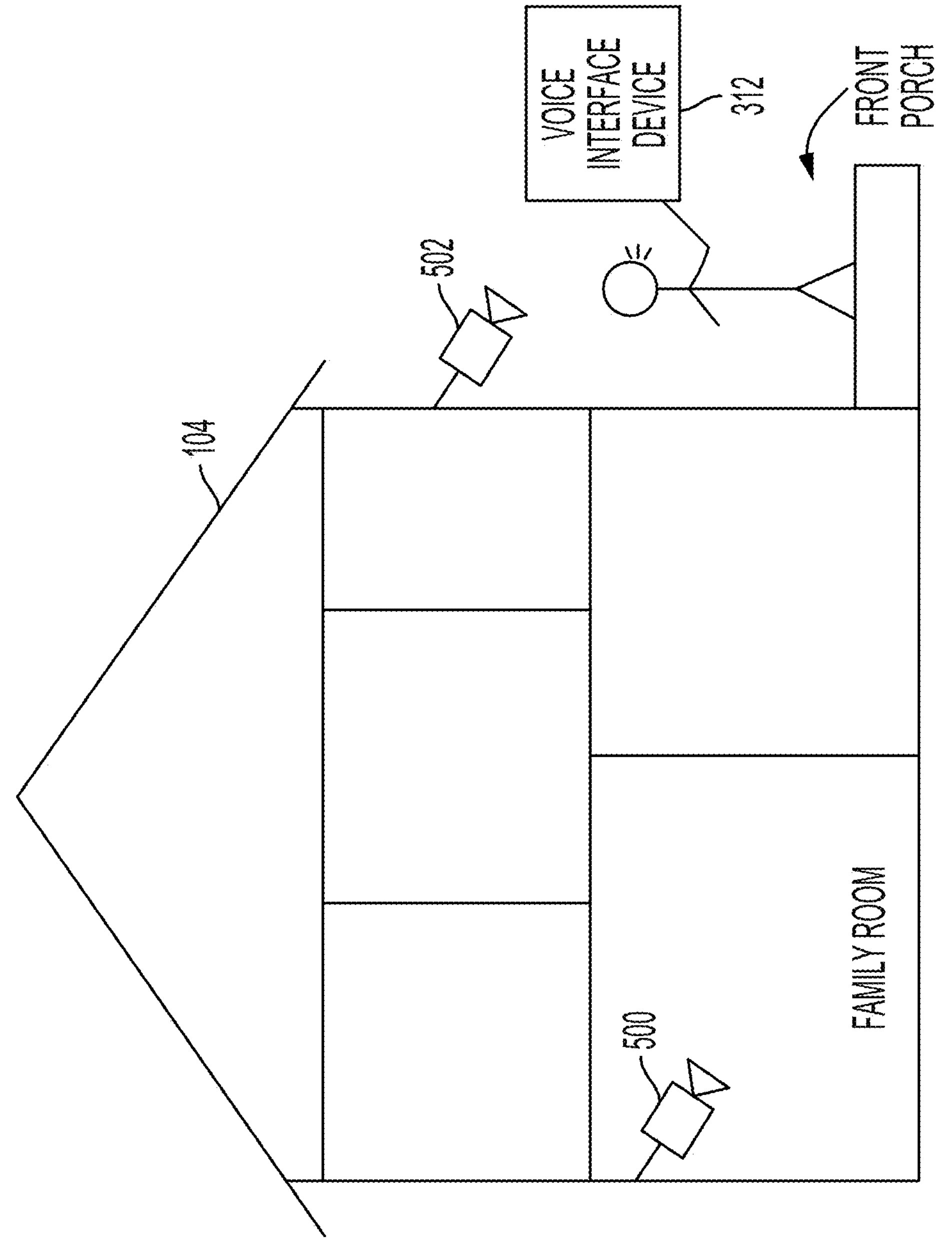
FIG. 5 is a simplified illustration of another scenario related to an ambiguous automation-configuration command.

FIG. 5 illustrates an example scenario for this implementation. As shown in FIG. 5, the family-room of a user's home includes a family-room security camera 500, and the front-porch of the user's home includes a front-porch security camera 502. In this scenario, as shown, the user may be standing on the front porch and may speak into a voice-interface device 312 the natural language automation-configuration command "Turn on this camera at 9:00 am"—without specifying which camera is "this camera".

In line with the discussion above, the voice-interface device 312 may send to the computing system 200 a digitized audio representation of this uttered automation-configuration command, which may be audio that includes both the uttered automation-configuration command and also background audio comprising nature sounds like birds chirping and so forth. ASR processing of this audio may then result in a determination that (i) the trigger per the automation-configuration command is the time of day being 9:00 am and (ii) the action to take in response to that trigger per the automation-configuration command is to turn on "this camera". Further, the computing system 200 may determine from the device registry 212 that there are at least two candidate cameras 500, 502 in the user's IoT ecosystem. At issue for the computing system 200 is then which camera is to be the subject of the requested automation rule.

To help resolve this ambiguity, as with the examples above, the computing system 200 could determine based on analysis of the spoken voice command that the "camera" should be a camera near the user when the user uttered the automation-configuration command, since the user referred to "this" camera. Given this determination, the computing system 200 could then proceed to use the background audio accompanying the user's automation-configuration command as a basis to determine which camera the user intended. In particular, the computing system 200 could refer to the device registry 212 to ascertain directly or indirectly the signature background audio per candidate camera, and the computing system 200 could then compare the background audio that accompanied the user's automation-configuration command with the signature background audio per candidate camera.

Based on this comparison, the computing system 200 may thereby determine that the background audio accompanying the user's automation-configuration command most closely matches the signature background audio of the front-porch security camera 502, and the computing system 200 may therefore determine that the front-porch security camera 502 is the intended camera.

Given this disambiguation, the computing system 200 may thereby establish that the user's automation-configuration command requests setup of an automation rule for turning on the front-porch security camera 502 when the time of day is 9:00 am. The computing system 200 may therefore configure itself with a logical construct defining that automation rule, and the computing system 200 may then apply that rule in practice.

Figure 6:
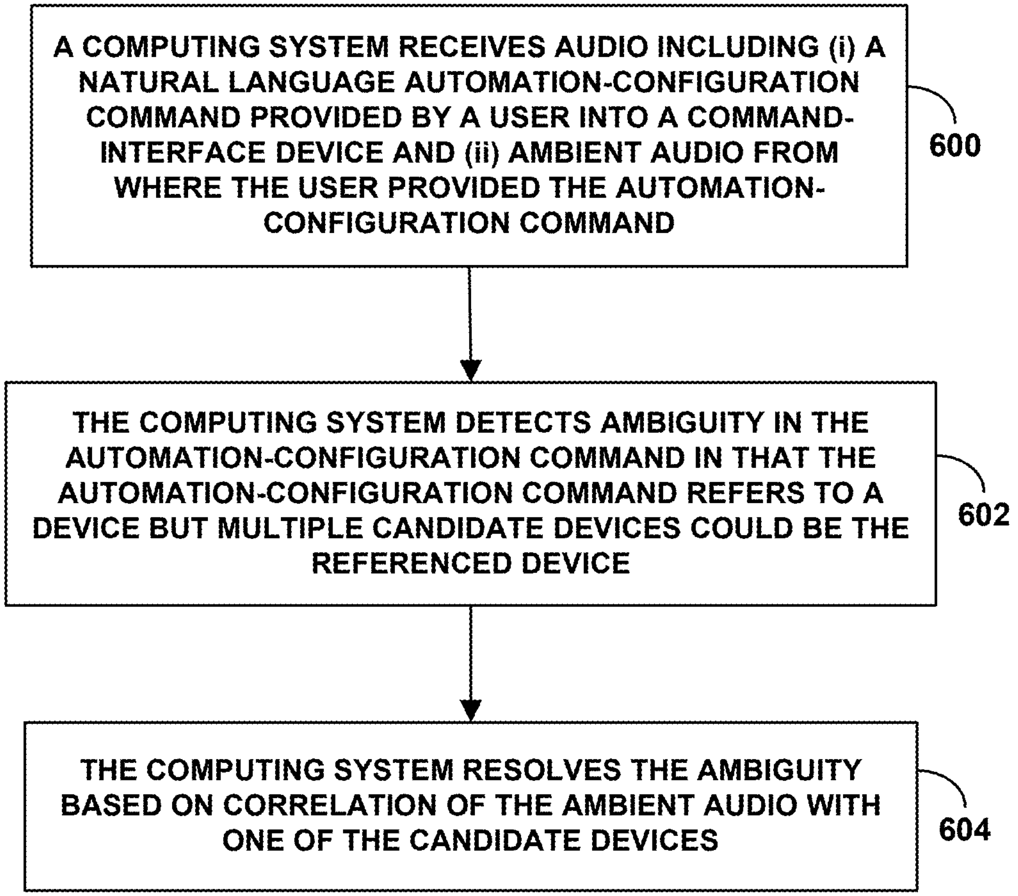
FIG. 6 is another flow chart illustrating a method to help disambiguate an automaton-configuration command.

FIG. 6 is a flow chart illustrating this process. As shown in FIG. 6, at block 600, a computing system receives audio including (i) a natural language automation-configuration command provided by a user into a command-interface device (e.g., a voice-interface device, a chatbot-interface device, or as sign-language through a sign-language-interface device such as a camera) and (ii) ambient audio from where the user provided the automation-configuration command. At block 602, the computing system then detects ambiguity in the automation-configuration command in that the automation-configuration command refers to a device but multiple candidate devices could be the referenced device. At block 604, the computing system then resolves the ambiguity based on correlation of the ambient audio with one of the candidate devices.

Use of User Input as a Basis to Determine which IoT Device is a Subject of an Automation-Configuration Command As yet another example implementation, the computing system 200 could engage in an exchange with the user as a basis to determine which of multiple candidate IoT devices a user meant by an indefinite reference to a device in the user's natural language automation-configuration command.

This implementation as well could apply in a scenario where the user's natural-language automation-configuration command directly or indirectly refers to a device in the user's IoT ecosystem but where that reference is indefinite because there are multiple devices in the IoT ecosystem that could be the referenced device. Further, here too, this could occur where the user refers to the device in relation to an automation trigger and/or where the user refers to the device in relation to an automation action.

To resolve the ambiguity in this scenario, the computing system 200 could cause presentation of per-device respective output and could receive from the user, in response to the presentation of the per-device respective output, a selection of the intended device.

As a specific example of this implementation, if the user's automation-configuration command refers to "this light" and does not specify which light is "this light," the computing system 200 may engage in processing as discussed above to identify at least two candidate lights in the user's IoT ecosystem. Further, through signaling with the user's smartphone, the computing system 200 may cause the IoT app on the user's smartphone to present to the user an associated ambiguity alert such as "Please tap here when the light you intend is on". The computing system 200 may then sequentially cycle through the candidate lights, successively turning on each light briefly (or perhaps successively changing color or other characteristic of each light briefly). When the user sees the intended light turn on (or change color or other characteristic), the user may then tap on the smartphone IoT app as instructed, and the IoT app may accordingly signal to the computing system 200, which may inform to the computing system 200 that the intended light is the light that was on when the user tapped.

Given this disambiguation, the computing system 200 may thereby establish that the user's automation-configuration command requests setup of an automation rule for turning on that particular light. The computing system 200 may therefore configure itself with a logical construct defining that automation rule, and the computing system 200 may then apply that rule in practice.

As another specific example of this implementation, if the user's automation-configuration command refers to "this camera" and does not specify which camera is "this camera," the computing system 200 may likewise engage in processing as discussed above to identify at least two candidate cameras in the user's IoT ecosystem. Further, through signaling with the each candidate camera and with the user's smartphone, the computing system 200 may cause each candidate camera to turn on and to provide a real-time video feed to the IoT app on the user's smartphone. And through signaling with the user's smartphone, the computing system 200 may cause the IoT app on the user's smartphone to receive the video feeds from the candidate cameras and to display video respectively of each feed (e.g., as an array of camera views, or sequentially) and to present to the user an associated ambiguity alert such as "Please tap on the camera view you intend". When the user sees on the IoT app a video feed from the intended camera, the user may then tap on that video feed as instructed, and the IoT app may accordingly signal to the computing system 200, which may inform the computing system that the intended camera is the camera that provided the video feed selected by the user.

Given this disambiguation, the computing system 200 may thereby establish that the user's automation-configuration command requests setup of an automation rule for turning on that particular camera. The computing system 200 may therefore configure itself with a logical construct defining that automation rule, and the computing system 200 may then apply that rule in practice.

Figure 7:
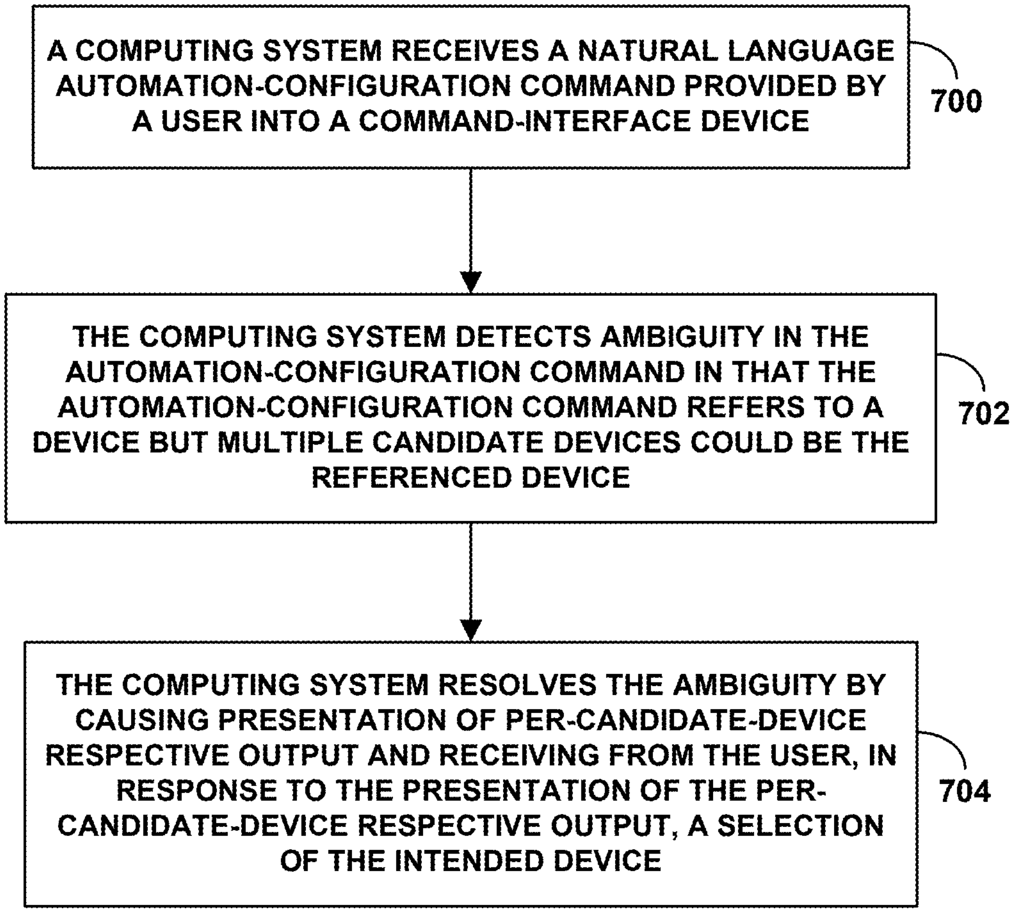
FIG. 7 is another flow chart illustrating a method to help disambiguate an automaton-configuration command.

FIG. 7 is a flow chart illustrating this process. As shown in FIG. 7, at block 700, a computing system receives a natural language automation-configuration command provided by a user into a command-interface device (e.g., a voice-interface device, a chatbot-interface device, or as sign-language through a sign-language-interface device such as a camera). At block 702, the computing system then detects ambiguity in the automation-configuration command in that the automation-configuration command refers to a device but multiple candidate devices could be the referenced device. At block 704, the computing system then resolves the ambiguity by causing presentation of per-candidate-device respective output and receiving from the user, in response to the presentation of the per-candidate-device respective output, a selection of the intended device.

Use of User Gesture as a Basis to Determine which IoT Device is a Subject of an Automation-Configuration Command As still another example implementation, the computing system 200 could evaluate a user's physical movement as a basis to determine which of multiple candidate IoT devices a user meant by an indefinite reference to a device in the user's natural language automation-configuration command.

This implementation could also apply in a scenario where the user's natural-language automation-configuration command directly or indirectly refers to a device in the user's IoT ecosystem but where that reference is indefinite because there are multiple devices in the IoT ecosystem that could be the referenced device. And, here too, this could occur where the user refers to the device in relation to an automation trigger and/or where the user refers to the device in relation to an automation action.

Further, this implementation may be especially useful in a scenario where the multiple candidate devices are all in a same or similar location as each other, such as all in the same room of the user's house for instance and where the is at least one camera in the location that is capturing a live video of the user at the time the user provides the automation-configuration command. For instance, this may assume that the user would have opted in to allowing use of such a live video feed.

To resolve the ambiguity in this scenario, the computing system 200 may evaluate the live video feed of the user to detect in the video feed that the user was gesturing toward a given one of the candidate devices when the user provided the automation-configuration command. Examples of such gesturing could be the user pointing a finger toward the given device, the user nodding the user's head toward the given device, and/or the user being physically proximate to the given device, among other possibilities.

To facilitate this in practice, the computing system 200 may receive the live video feed including video captured when the user provided the automation-configuration command, and the computing system may respond to the ambiguity by analyzing the video feed to detect the gesture in relation to various candidate devices. The computing system 200 may be pre-provisioned with spatial coordinates of the multiple candidates devices in the camera view of the video feed, and the computing system 200 may engage in wireframe or other analysis of the video of the user in the camera view as a basis to determine which candidate device the user was indicating by the user's physical gesture at the time.

Given this disambiguation, the computing system 200 may thereby establish that the user's automation-configuration command requests setup of an automation rule regarding that determined device. The computing system 200 may therefore configure itself with a logical construct defining that automation rule, and the computing system 200 may then apply that rule in practice.

Use of a Knowledge Graph as a Basis to Disambiguate an IoT Automation-Configuration Command As further noted above, the computing system 200 could also take into account a knowledge graph as a basis to disambiguate a user's natural language automation-configuration command.

A representative knowledge graph, for instance, may correlate particular people in the user's home with particular rooms, devices, and so forth. For instance, the knowledge graph may indicate information such as rooms of the user's home, cars associated with the user, people in the user's family, etc. Further, the knowledge graph may indicate interrelationships, such as which rooms are used for which purposes, which cars are associated with which people in the user's family, etc.

The computing system 200 may build a data representation of this knowledge graph based on user input. For instance, the computing system 200 may receive user input describing rooms of the user's home, noting members of the user's family, and describing associations between cars and family members and so forth, and the computing system 200 could store this information as part of the graph. In addition or alternatively, the computing system 200 may build this knowledge graph over time by inference. Further, the device registry could be part of this knowledge graph.

The computing system 200 may then refer to this knowledge graph as a basis to resolve an ambiguity in the user's automation-configuration command. As noted above, for instance, if the user's spouse is named Leslie and the user provides the automation-configuration command to "Open the garage when Leslie's car approaches," at issue may be what car is Leslie's car. To resolve this issue, the computing system 200 may refer to the knowledge graph to determine which car is Leslie's car. The computing system may then configure itself with an automation rule to open the garage when that determined car approaches.

The computing system 200 may also apply a machine-learning model that is trained with these or other such interrelationships. Such a model could be hosted in the user's home, e.g., at the LAN edge, to help avoid sending private information to the cloud. In an example implementation, natural-language speech processing (e.g., ASR) could be done in the cloud, and then reference to the knowledge graph could be done locally at the user's home, e.g., for purposes of disambiguation, such as to identify multiple candidate devices, rooms, or users that may be what the user meant in the user's automation-configuration command. Alternatively, all of the processing could be done locally at the user's home.

Extension to IoT-Action Commands

While the above discussion focuses on use of context as a basis to disambiguate a user's automation-configuration command so as to facilitate configuring an IoT automation rule, similar techniques could also be applied to facilitate responding to a natural language IoT-action command.

For instance, the user may provide the natural language command "Turn on this light," without specifying which light the user means. Upon receipt and ASR processing of this natural language command, the computing system 200 may then determine from the device registry that there are multiple lights in the user's IoT ecosystem. At issue for the computing system could then be which light the user wants to turn on.

To resolve the ambiguity in this scenario, the computing system 200 could apply any of the mechanisms discussed above. For instance, the computing system 200 could user network signaling, ambient audio, user input, and/or user gesture as a basis to determine which light the user meant. The computing system 200 may then accordingly engage in signaling to turn on that determine light rather than one or more other candidate lights.

Additional Aspects

In example implementations, the computing system 200 may carry out other useful operations as well, to help support automation rules or the like in the user's IoT ecosystem.

For example, through the IoT app on the user's smartphone for instance, the computing system 200 could propose new automation rules based on past activity. For instance, the computing system 200 may observe over time that the lights in the user's family room turn on at about 7:00 pm each day and may thus correlate the occurrence of that time of day with the turning on of the lights in the user's family room. In response, the computing system 200 may present the user a prompt to establish an automation rule to turn on the family-room lights at 7:00 pm each day. The computing system 200 may then receive user input in response to this prompt, requesting setup of that automation rule, and the computing system 200 may responsively configure the automation rule.

As another example, also through the IoT app on the user's smartphone for instance, the computing system 200 may run through one or more automations that are configured for the user's IoT ecosystem. For instance, if the user has configured a "morning routine" with one or more automation rules keyed to the use's wakeup time in the morning, the user may provide the voice command "Show me what happens with my morning routine in this room". If the user does not indicate which room is "this room," the computing system 200 may use one or more of the techniques above to help identify the room in which the user is positioned when the user provides that command. The computing system 200 may then run through one or more automations defined for the user's "morning routine" to show the user those automations.

As yet another example, the computing system 200 may identify conflicts among currently provisioned automation rules for the user's IoT ecosystem and may notify the user of the identified rule conflicts. For instance, the computing system 200 may determine that one rule turns on a given light at a particular time of day or in response to another particular trigger and that another rule turns off that same light at the same time of day or in response to the same trigger. The computing system 200 may then engage in signaling with the user's smartphone to cause the IoT app on the user's smartphone to present a notice of that detected conflict.

As still another example, the computing system 200 may use crowdsourcing as a basis to configure automation rules for the user's IoT ecosystem. For instance, a cloud-based aspect of the computing system 200 may determine that multiple homes on the user's street have their Christmas tree lights set to turn on at 6:00 pm each evening. Based on that information, the computing system 200 may conclude that the user's home should also have its Christmas tree lights turn on at that same time. The computing system 200 may then automatically configure and apply that rule, and/or the computing system may prompt the user for approval to configure that rule and, upon receipt of user approval, may then configure and apply the rule.

Example Implementation

Figure 8:
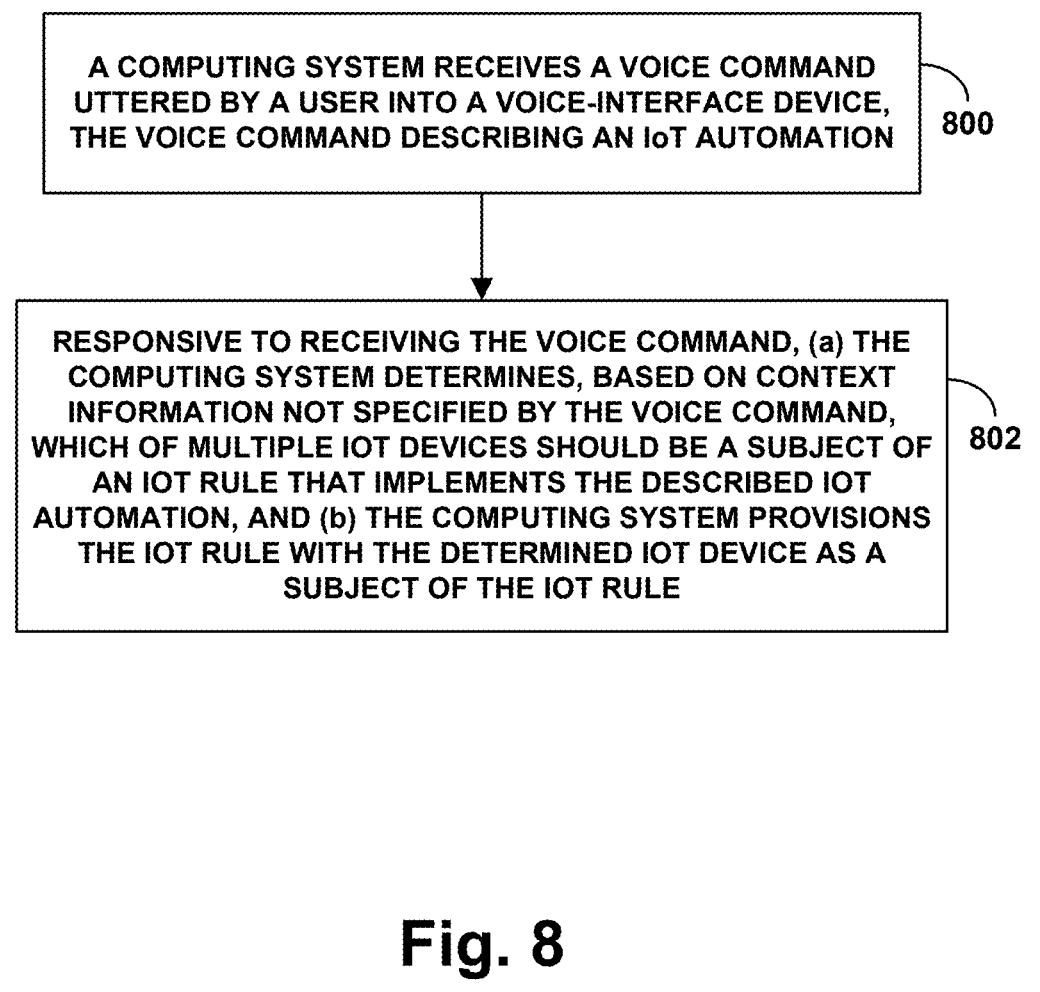

FIG. 8 is another flow chart illustrating a method that could be carried out in accordance with the present disclosure. As shown in FIG. 8, at block 800, the method includes a computing system receiving a voice command uttered by a user into a voice-interface device, the voice command describing an IoT automation (e.g., being a natural language expression of a desired automation rule for the computing system to establish for later application in an IoT ecosystem of the user). At block 802 the method then includes, responsive to receiving the voice command, (a) the computing system determining, based on context information not specified by the voice command, which of multiple IoT devices should be a subject of an IoT rule that implements the described IoT automation, and (b) the computing system provisioning the IoT rule (e.g., configuring itself to apply the IoT rule) with the determined IoT device as a subject of the IoT rule.

In line with the discussion above, the context information in this method could include proximity of the voice-interface device respectively with each of the multiple IoT devices. In that case, for instance, the act of determining based on the context information which of the multiple IoT devices should be the subject of the IoT rule that implements the described IoT automation could involve (i) determining, respectively for each IoT device of the multiple IoT devices, a measure of proximity of the voice-interface device to the IoT device and (ii) selecting an IoT device from the multiple IoT devices, as the IoT device to be the subject of the IoT rule that implements the described IoT automation, with the selecting being based on the voice-interface device having closest proximity to the selected IoT device. Further, the act of determining respectively for each IoT device of the multiple IoT devices, the measure of proximity of the voice-interface device to the IoT device is based on one or more factors such as (i) wireless signal strength between the voice-interface device and the IoT device and/or (ii) wireless signal latency between the voice-interface device and the IoT device.

In addition or alternatively, as discussed above, the context information in this method could include audio in an environment of the user when the user uttered the voice command describing the IoT automation. And in that case, the act of determining based on the context information which of the multiple IoT devices should be the subject of the IoT rule that implements the described IoT automation could involve (i) determining, based on the audio in the environment of the user when the user uttered the voice command, whether the user was indoors or rather outdoors when the user uttered the voice command and (ii) selecting an IoT device from the multiple IoT devices, as the IoT device to be the subject of the IoT rule that implements the described IoT automation, with the selecting being based on the determining of whether the user was indoors or rather outdoors when the user uttered the voice command. Further, the selecting could include (i) if the determining is that the user was outdoors when the user uttered the voice command, then, based at least on the determining that the user was outdoors when the user uttered the voice command, selecting as the IoT device an IoT device that is outdoors rather than an IoT device that is indoors and (ii) if the determining is that the user was indoors when the user uttered the voice command, then, based at least on the determining that the user was indoors when the user uttered the voice command, selecting as the IoT device an IoT device that is indoors rather than an IoT device that is outdoors.

As discussed above, in these or other implementations, the voice-interface device could be another IoT device with a microphone, a smartphone, or a remote control, among other possibilities.

Further, the present disclosure contemplates a computing system that includes at least one network communication interface, at least one processor, non-transitory data storage, and program instructions stored in the non-transitory data storage and executable by the at least one processor to carry out operations such as those of the above method.

Still further, the present disclosure also contemplates non-transitory data storage in the form of at least one non-transitory computer-readable medium (e.g., optical, magnetic, or flash storage, RAM, ROM, EPROM, EEPROM, cache memory, and/or other computer-readable media, etc.) encoded with, embodying, or otherwise storing program instructions executable by at least one processor to carry out various operations as described herein.

Yet further, the present disclosure also contemplates a computer program comprising a set of program instructions executable by at least one processor of a computing system to carry out various operations described herein, such as to perform the various operations of the example methods and variations discussed above. In an example implementation, the computer program could further be stored in non-transitory data storage such as that noted above, among other possibilities.

Exemplary embodiments have been described above. Those skilled in the art will understand, however, that changes and modifications may be made to these embodiments without departing from the true scope and spirit of the invention.

What is claimed is:

1. A method comprising:

receiving into a computing system a voice command uttered by a user into a voice-interface device, the voice command describing an Internet-of-Things (IoT) automation; and responsive to receiving the voice command, (a) determining by the computing system, based on context information not specified by the voice command, which of multiple IoT devices should be a subject of an IoT rule that implements the described IoT automation, and (b) provisioning by the computing system the IoT rule with the determined IoT device as the subject of the IoT rule, wherein the context information comprises audio in an environment of the user when the user uttered the voice command describing the IoT automation, and wherein determining based on the context information which of the multiple IoT devices should be the subject of the IoT rule that implements the described IoT automation comprises (i) determining, based on the audio in the environment of the user when the user uttered the voice command, whether the user was indoors or rather outdoors when the user uttered the voice command and (ii) selecting an IoT device from the multiple IoT devices, as the IoT device to be the subject of the IoT rule that implements the described IoT automation, with the selecting being based on the determining of whether the user was indoors or rather outdoors when the user uttered the voice command.

2. The method of claim 1, wherein the context information further comprises proximity of the voice-interface device respectively with each of the multiple IoT devices.

3. The method of claim 2, wherein determining based on the context information which of the multiple IoT devices should be the subject of the IoT rule that implements the described IoT automation further comprises:

determining, respectively for each IoT device of the multiple IoT devices, a measure of proximity of the voice-interface device to the IoT device; and selecting an IoT device from the multiple IoT devices, as the IoT device to be the subject of the IoT rule that implements the described IoT automation, with the selecting being based on the voice-interface device having closest proximity to the selected IoT device.

4. The method of claim 3, wherein determining respectively for each IoT device of the multiple IoT devices, the measure of proximity of the voice-interface device to the IoT device is based on at least one factor selected from the group consisting of (i) wireless signal strength between the voice-interface device and the IoT device and (ii) wireless signal latency between the voice-interface device and the IoT device.

5. The method of claim 1, wherein selecting an IoT device from the multiple IoT devices, as the IoT device to be the subject of the IoT rule that implements the described IoT automation, with the selecting being based on the determining of whether the user was indoors or rather outdoors when the user uttered the voice command comprises:

if the determining is that the user was outdoors when the user uttered the voice command, then, based at least on the determining that the user was outdoors when the user uttered the voice command, selecting as the IoT device an IoT device that is outdoors rather than an IoT device that is indoors; and if the determining is that the user was indoors when the user uttered the voice command, then, based at least on the determining that the user was indoors when the user uttered the voice command, selecting as the IoT device an IoT device that is indoors rather than an IoT device that is outdoors.

6. The method of claim 1, wherein the voice-interface device comprises a device selected from the group consisting of another IoT device, a smartphone, and a remote control.

7. The method of claim 1, wherein determining based on the context information which of the multiple IoT devices should be the subject of the IoT rule further comprises determining based on a knowledge graph which of the multiple IoT devices should be the subject of the IoT rule.

8. A computing system comprising:

at least one network communication interface;

at least one processor;

non-transitory data storage; and program instructions stored in the non-transitory data storage and executable by the at least one processor to carry out operations including:

receiving a voice command uttered by a user into a voice-interface device, the voice command describing an Internet-of-Things (IoT) automation, and responsive to receiving the voice command, (a) determining, based on context information not specified by the voice command, which of multiple IoT devices should be a subject of an IoT rule that implements the described IoT automation, and (b) provisioning the IoT rule with the determined IoT device as the subject of the IoT rule, wherein the context information comprises audio in an environment of the user when the user uttered the voice command describing the IoT automation, and wherein determining based on the context information which of the multiple IoT devices should be the subject of the IoT rule that implements the described IoT automation comprises (i) determining, based on the audio in the environment of the user when the user uttered the voice command, whether the user was indoors or rather outdoors when the user uttered the voice command and (ii) selecting an IoT device from the multiple IoT devices, as the IoT device to be the subject of the IoT rule that implements the described IoT automation, with the selecting being based on the determining of whether the user was indoors or rather outdoors when the user uttered the voice command.

9. The computing system of claim 8, wherein the context information further comprises proximity of the voice-interface device respectively with each of the multiple IoT devices.

10. The computing system of claim 9, wherein determining based on the context information which of the multiple IoT devices should be the subject of the IoT rule that implements the described IoT automation further comprises:

determining, respectively for each IoT device of the multiple IoT devices, a measure of proximity of the voice-interface device to the IoT device; and selecting an IoT device from the multiple IoT devices, as the IoT device to be the subject of the IoT rule that implements the described IoT automation, with the selecting being based on the voice-interface device having closest proximity to the selected IoT device.

11. The computing system of claim 10, wherein determining respectively for each IoT device of the multiple IoT devices, the measure of proximity of the voice-interface device to the IoT device is based on at least one factor selected from the group consisting of (i) wireless signal strength between the voice-interface device and the IoT device and (ii) signal latency between the voice-interface device and the IoT device.

12. The computing system of claim 8, wherein selecting an IoT device from the multiple IoT devices, as the IoT device to be the subject of the IoT rule that implements the described IoT automation, with the selecting being based on the determining of whether the user was indoors or rather outdoors when the user uttered the voice command comprises:

if the determining is that the user was outdoors when the user uttered the voice command, then, based at least on the determining that the user was outdoors when the user uttered the voice command, selecting as the IoT device an IoT device that is outdoors rather than an IoT device that is indoors; and if the determining is that the user was indoors when the user uttered the voice command, then, based at least on the determining that the user was indoors when the user uttered the voice command, selecting as the IoT device an IoT device that is indoors rather than an IoT device that is outdoors.

13. The computing system of claim 8, wherein the voice-interface device comprises a device selected from the group consisting of another IoT device, a smartphone, and a remote control.

14. Non-transitory data storage having stored thereon program instructions executable by at least one processor to carry out operations comprising:

receiving a voice command uttered by a user into a voice-interface device, the voice command describing an Internet-of-Things (IoT) automation, and responsive to receiving the voice command, (a) determining, based on context information not specified by the voice command, which of multiple IoT devices should be a subject of an IoT rule that implements the described IoT automation, and (b) provisioning the IoT rule with the determined IoT device as the subject of the IoT rule, wherein the context information comprises audio in an environment of the user when the user uttered the voice command describing the IoT automation, and wherein determining based on the context information which of the multiple IoT devices should be the subject of the IoT rule that implements the described IoT automation comprises (i) determining, based on the audio in the environment of the user when the user uttered the voice command, whether the user was indoors or rather outdoors when the user uttered the voice command and (ii) selecting an IoT device from the multiple IoT devices, as the IoT device to be the subject of the IoT rule that implements the described IoT automation, with the selecting being based on the determining of whether the user was indoors or rather outdoors when the user uttered the voice command.

15. The non-transitory data storage of claim 14, wherein the context information further comprises proximity of the voice-interface device respectively with each of the multiple IoT devices, and wherein determining based on the context information which of the multiple IoT devices should be the subject of the IoT rule that implements the described IoT automation further comprises:

determining, respectively for each IoT device of the multiple IoT devices, a measure of proximity of the voice-interface device to the IoT device; and selecting an IoT device from the multiple IoT devices, as the IoT device to be the subject of the IoT rule that implements the described IoT automation, with the selecting based on the voice-interface device having closest proximity to the selected IoT device.

16. The non-transitory data storage of claim 15, wherein determining respectively for each IoT device of the multiple IoT devices, the measure of proximity of the voice-interface device to the IoT device is based on at least one factor selected from the group consisting of (i) wireless signal strength between the voice-interface device and the IoT device and (ii) signal latency between the voice-interface device and the IoT device.

* * * * *